United States Patent
Smith

(10) Patent No.: US 7,077,642 B2
(45) Date of Patent: Jul. 18, 2006

(54) PLUNGER MOLDING MACHINE WITH TAPERED BORE AND THERMAL TRANSFER FINS

(75) Inventor: Lyle James Smith, Providence, RI (US)

(73) Assignee: Cool Options, Inc., Warwick, RI (US)

( * ) Notice: Subject to any disclaimer, the term of this patent is extended or adjusted under 35 U.S.C. 154(b) by 76 days.

(21) Appl. No.: 10/882,629

(22) Filed: Jul. 1, 2004

(65) Prior Publication Data

US 2004/0241279 A1 Dec. 2, 2004

Related U.S. Application Data

(62) Division of application No. 10/213,177, filed on Aug. 6, 2002.

(60) Provisional application No. 60/316,484, filed on Aug. 31, 2001.

(51) Int. Cl.
*B29C 45/53* (2006.01)
*B29C 45/62* (2006.01)

(52) U.S. Cl. ............... 425/558; 425/382.4; 425/467; 425/468

(58) Field of Classification Search ............ 425/206, 425/207, 467, 468, 557, 558, 382.4
See application file for complete search history.

(56) References Cited

U.S. PATENT DOCUMENTS

| | | | |
|---|---|---|---|
| 4,504,210 A | 3/1985 | Titz et al. ............... 425/461 |
| 4,509,907 A | 4/1985 | Ratheiser ............... 425/197 |
| 4,908,169 A | 3/1990 | Galic et al. ............. 264/410 |
| 5,059,371 A | 10/1991 | Saheki et al. ........... 264/108 |
| 5,176,925 A | 1/1993 | Weber et al. ............ 425/191 |
| 5,496,164 A | 3/1996 | Czarnik ................ 425/72.1 |
| 5,538,784 A | 7/1996 | Subramanian ......... 428/297.4 |
| 5,653,534 A | 8/1997 | Matsumoto et al. ...... 366/76.1 |
| 5,795,600 A | 8/1998 | Rosema ................ 425/562 |
| 5,885,628 A | 3/1999 | Swenson et al. ......... 425/549 |
| 5,985,200 A | 11/1999 | Vermilion et al. ..... 264/328.17 |
| 6,017,210 A * | 1/2000 | Takayama et al. ........ 425/557 |
| 6,030,203 A | 2/2000 | Kuroda ................ 425/561 |
| 6,261,495 B1 | 7/2001 | McCullough ........... 264/108 |

* cited by examiner

*Primary Examiner*—Joseph S. Del Sole
*Assistant Examiner*—Emmanuel S. Luk
(74) *Attorney, Agent, or Firm*—Barlow, Josephs & Holmes, Ltd.

(57) ABSTRACT

A plunger machine for molding reinforced polymer compositions is provided. The plunger machine has particular application in molding polymer that is reinforced with particles having an aspect ratio that is greater than 1:1. The plunger machine includes a barrel housing with a smooth walled barrel with longitudinal fins projecting inwardly towards the center of the bore that defines a main melt chamber. A plunger housing, having a plunger bore, defines an initial melt chamber and is in communication with the main melt chamber. A plunger resides in the plunger bore and is reciprocatable therein. The barrel bore is continuously inwardly tapered and cooperates with the longitudinal fins to provide a shortened melt period and a smooth transition and alignment of reinforcing members within the polymer mixture during the melt process. The smooth bore and cooperating fins ensure substantial alignment of the reinforcement members with the longitudinal axis of the bore in the direction of the composition flow to avoid excessive breakage of the reinforcing particles and prepare the polymer mixture for extrusion into a mold assembly.

5 Claims, 4 Drawing Sheets

PLUNGER MOLDING MACHINE WITH TAPERED BORE AND THERMAL TRANSFER FINS

CROSS-REFERENCE TO RELATED APPLICATIONS

This application is a divisional of U.S. Ser. No. 10/213,177, filed on Aug. 6, 2002, which is related to and claims priority from earlier filed provisional patent application No. 60/316,484, filed Aug. 31, 2001.

BACKGROUND OF THE INVENTION

The present invention relates generally to an improved injection molding machine and method of using the machine to form net shape molded parts. More specifically, the present invention relates to a plunger molding machine for use in molding reinforced polymer compositions, particularly, polymers loaded with thermally conductive filler media, such as carbon, ceramics and metallic material in the form of fibers and flakes.

In the molding industry, it has been well known to injection mold plastic materials into various articles of commerce. In particular, it has become well known to load such plastics or polymer-based compositions with filler materials to form a reinforced polymer composition. Reinforcing a polymer composition with other media is done for many different purposes. For example, a reinforced polymer composition may be employed to provide a thermally conductive plastic where the reinforcing material is highly thermally conductive, such as is the case with carbon fiber or aluminum flakes. Another example includes an application where the polymer is loaded with copper fiber to provide an electrically conductive polymer composition. Still further, aluminum flakes may be loaded in the polymer composition to provide a composition that includes EMI shielding properties. Also, glass, carbon or other structural fibers may be employed to add strength and/or stiffness.

In general, the loading of a polymer base matrix, with a reinforcing material, raises many concerns regarding the ability to successfully injection mold such a composition due to the presence of the additional suspended reinforcing material. For example, if the reinforcing material that is loaded into the polymer matrix is long carbon fiber, there is a greatly increased potential for strand and/or filament breakage during the melting and molding process. During the molding process, the competing issues of thorough mixing of the loaded polymer composition and the concern of excessive breakage of the delicate reinforcing media must be balanced to achieve the desired product. Prior art molding machines typically create high turbulence and/or grinding of the polymer material for the purposes of mixing the composition. These prior art machines commonly included a torpedo-shaped member or spreader located in the center of the injection molding bore to increase the level of turbulence as the composition passes through the bore to cause the polymer to melt in a uniform manner and to improve the mixing of the composition. However, such turbulence and grinding of the polymer composition under pressure during the molding process results in increased reinforcing fiber breakage and greatly reduced reinforcement media length.

As a result, it can be clearly seen that these known molding processes are incompatible with the molding of thermally conductive polymer compositions as described above. In particular, a thermally conductive composition that employs carbon fiber reinforcing requires that the breakage or damage to the reinforcing fibers be kept to a minimum to ensure that the desired properties of the resulting composition are maintained. In the above example, if the lengths of the carbon fibers loaded within the polymer composition are ground up into much shorted lengths, it is clear that the overall thermal conductivity of the composition will be degraded as a result.

In an attempt to address the problems with breakage of reinforcing fibers, compression molding has been attempted where there is a manual lay-up of material and the reinforcing media thereon. As can be understood, such manual assembly is expensive and is far too slow for mass production. Thus, compression molding is inadequate and impractical for molding reinforced material and suffers from economic and geometry-related limitations.

In addition to the problems associated with the reduction of the length of reinforcing media, the alignment of the reinforcing fibers within the composition is also a concern. In the examples above, a highly aligned and oriented loading of reinforcing material along the path of conductivity is preferred to obtain higher performance of the molded composition. For example, a highly oriented array of carbon fiber within a polymer base would yield higher thermal conductivities than a composition that included randomly oriented fibers, because the number of transitions from carbon to polymer to carbon within the composition would be greatly reduced. Further, packing densities are higher when the fibers or filaments are well-aligned. The foregoing alignment and breakage problems become even more important where the aspect ratio of the reinforcing media becomes larger and larger.

Tapered bore injection molding machines have also been used to overcome the above noted deficiencies. However, while tapered bore machines preserve reinforcing fiber length and alignment, since there is no transfer of heat to the center of the bore the polymer melts in an uneven fashion and requires extended melt time within the injection molding bore.

In view of the foregoing, there is a demand for an improved injection molding machine and method that is well suited for accommodating polymer compositions loaded with reinforcing media having aspect ratios greater than 1:1 while enhancing the melt uniformity of the composition. Further, there is a demand for a molding machine that is capable of greatly decreasing the amount of breakage of reinforcing media during the molding process while enhancing the speed at which the polymer reaches its molten state. There is also a demand for a molding machine and method of using the machine that can better align reinforcing media along the line of melt flow to provide a better oriented reinforced composition.

BRIEF SUMMARY OF THE INVENTION

In this regard, the present invention provides a novel molding machine and method of using the machine to injection mold a reinforced polymer composition. The present invention results in a reduction in the amount of damage to the reinforcing particles loaded in the polymer molding composition while providing a increased uniformity in the heat transfer from the injection bore to the composition that results in a reduced residence time, the time required for heating the polymer to achieve the desired melt viscosity. The plunger injection machine of the present invention has particular application in molding polymer compositions that are reinforced with particles having an aspect ratio that is greater than 1:1.

The plunger machine includes a barrel housing with an interior barrel bore that defines a main melt chamber. A plunger housing, having a plunger bore, defines an initial melt chamber that is in communication with the main melt chamber. A plunger resides in the plunger bore and is reciprocatable therein. The barrel bore is continuously tapered inwardly to provide a smooth transition of the melted polymer composition while causing an alignment of reinforcing members in the polymer mixture during the melt process. The inner wall of the barrel bore is substantially smooth with a plurality of longitudinal fins extending along the length of the bore. The fins on the interior of the bore are in thermal communication with the bore and provide thermal transfer paths that allow the heat from the melt element to be transferred to the interior of the flow and therefore more uniformly throughout the polymer media. In addition, the configuration of the smooth bore walls and longitudinal fins cooperate to ensure substantial alignment of the reinforcement members with the longitudinal axis of the bore to avoid excessive breakage of the reinforcing particles and prepare the polymer mixture for extrusion into a mold assembly. Compression of the polymer composition via the plunger is minimized to avoid unwanted breakage of the reinforcement particles, which is deleterious to the integrity of the reinforcing media.

In accordance with the method of the present invention, a mixture of polymer, reinforcing particles, such as carbon fibers of an aspect ration greater than 1:1, are fed into a feed port with the assistance of an auger through a hopper. The mixture is gently fed into an initial melt chamber where the mixture is melt and then urged by a plunger into a main melt chamber. The main melt chamber includes smooth walls and a plurality of longitudinal fin sections. The walls and fins of the main melt chamber are heated by heater bands, or the like, and gradually and inwardly tapered to gradually and gently melt the mixture and to gradually align the reinforcing particles with the polymer base matrix without causing excessive breakage of the reinforcing particles. The fins assist in transferring heat into the path of the flow increasing the speed at which the media is melted, thus reducing the required residence time of the polymer composition within the melt chamber. At the exit port of the main melt chamber, the reinforcing members are substantially aligned lengthwise along the direction of flow of the melt within the chamber to provide a highly oriented melt mixture for subsequent injection into a mold for an article.

Accordingly, one of the objects of the present invention is the provision of an injection molding device for molding a polymer composition that includes high aspect ratio reinforcing particles while minimizing the breakage of the particles. Another object of the present invention is the provision of an injection molding device for the molding of a reinforced polymer composition that produces a high degree of axial alignment of the reinforcing material during the melting and injection process. A further object of the present invention is the provision of an injection molding device that preserves the length of the reinforcing particles in a polymer composition while providing enhanced heat transfer from the device to the composition to reduce the residence time of the polymer composition within the injection bore. It is yet another object of the present invention is the provision of an injection molding method where a polymer composition is reinforced with high aspect ration filler so that the length of the filler particles is preserved and a substantial alignment of the particles is achieved.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
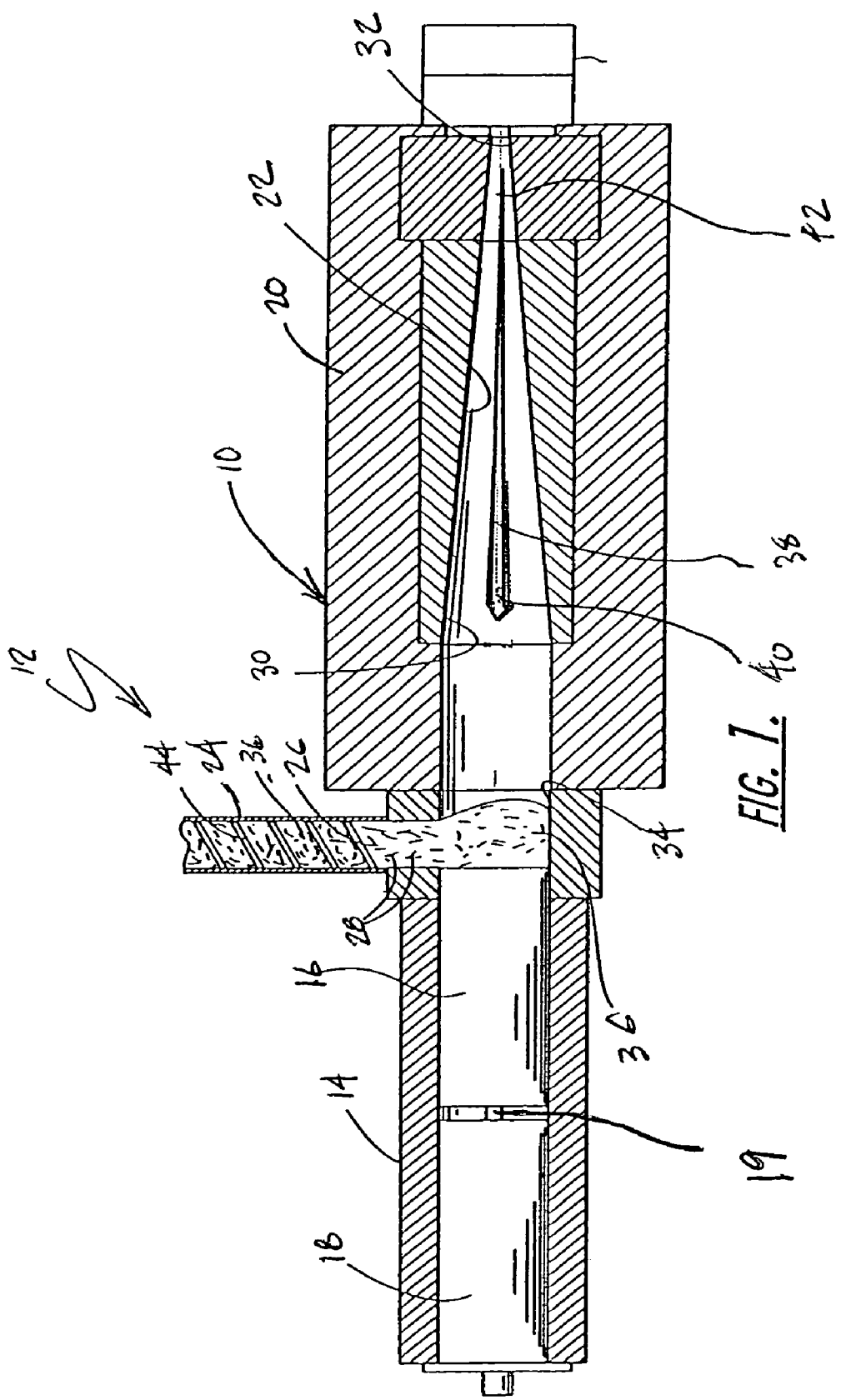
FIG. 1 is a cross-sectional view of the molding machine of the present invention illustrating the first step of injection molding a part in accordance with the method of the present invention.

Referring now to the drawings, the present invention injection molding barrel 10 shown in conjunction with a molding machine 12 and corresponding method of using the machine 12 is shown and generally illustrated in FIGS. 1–4. The machine 12 is suitable for accommodating a wide array of compositions of different materials loaded with reinforcing media of different shapes in the form of fibers, flakes, ribbons and rice. For example, the present invention 12 is suitable for molding a thermally conductive polymer composition loaded with carbon fibers as well as a polymer composition loaded with aluminum flakes tailored for EMI shielding applications. Further, an aluminum base material may be loaded with steel flakes to enhance the physical tensile strength of the resultant molded part. For simplicity and ease of illustration, the molding machine 12 and corresponding method will be described in detail below in connection with a thermally conductive composition with a polymer base material loaded with carbon fiber reinforcing. This is one example of the many applications of the machine 12 and method of the present invention where a base material is loaded with a reinforcing media that needs to be aligned but not broken during the molding process. This example is not intended to be limiting, as the present application has broad applications relating to the general concepts described herein.

Figure 2:
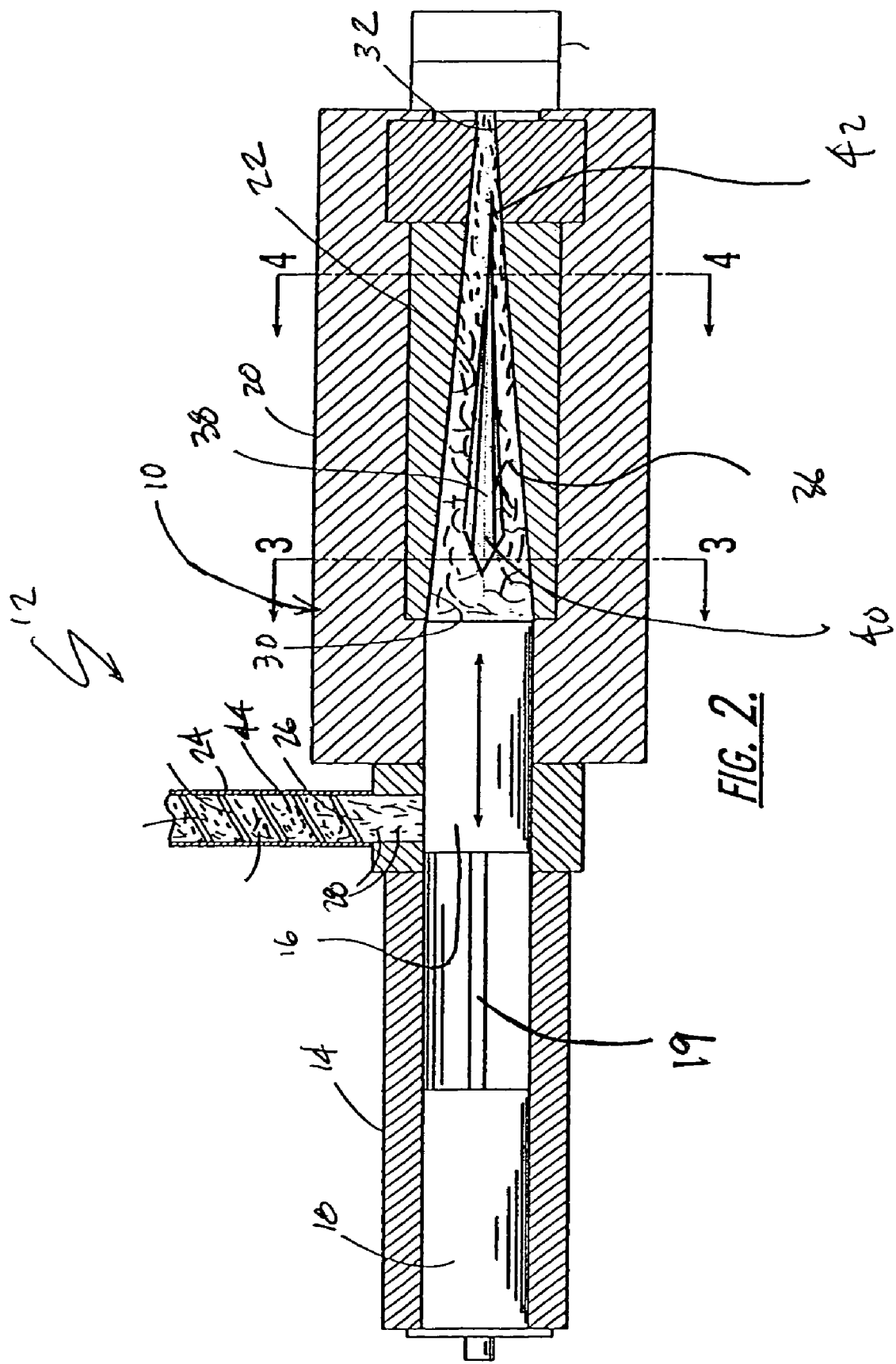
FIG. 2 is cross-sectional view the preferred embodiment of the molding machine of the present invention illustrating the step of packing the main melt chamber in accordance with the present invention.

Referring both to FIGS. 1 and 2, cross-sectional views of the injection molding barrel 10 of the present invention in connection with a plunger molding machine 12 is shown. A plunger housing 14 that contains a plunger 16 or piston is generally illustrated. The plunger 16 is movable between a retracted position, as shown in FIG. 1, and a forward position, as shown in FIG. 2, with the assistance of a hydraulic pump 18 or other similar reciprocating apparatus via linkage 19. The plunger housing 14 is mated with a barrel housing 20 of the injection molding barrel 10 that has a barrel bore 22 located therein. The bore 22 is configured in accordance with the present invention as will be further described below. In addition, a feed port 24 is provided, which communicates with the plunger housing 14 and provides a means by which the dry polymer mixture 26 and reinforcing fibers 28 can be fed to the molding machine 12 for melting and subsequent extrusion. The extruded material may be extruded directly into a cavity in a mold assembly to form a molded part or extruded as a rod and cut into pellets for later use in future molding operations. Details of the molding process in accordance with the present invention will be further described below.

Still referring to FIGS. 1 and 2, the construction of the barrel 10 of the molding machine 12 of the present invention is shown. The inner construction of the barrel housing 20 is arranged to provide a substantially tapered bore 22 where the entry port 30 is larger than the exit port 32. Further, the entry port 30 of the bore 22 is substantially equal to the dimension of the exit 34 of the plunger housing 14 and preferably, at least a first portion of the bore 22 of the barrel housing 20 is, essentially, identical to the dimension of the bore 34 of the plunger housing 14 so as to receive the reciprocating plunger 16 therein. The barrel bore 22 gradually tapers inwardly from a diameter of, for example, approximately 2.0 inches to an exit port 32 of, for example, approximately 0.25 inches and extends, for example, to a length of approximately 12.0 inches. The stroke length of the plunger 16 is, for example, approximately 7.0 inches. The interior surface of the barrel bore 22 is generally a smooth and polished surface to allow a smooth and even flow of the extrusion material 36. Further, on the surface of the bore 22, several fins 38 are provided. The fins 38 are generally linearly shaped ribs that align substantially in alignment with the longitudinal axis of the bore 22, extending between the entry port 30 and the exit port 32.

Figure 3:
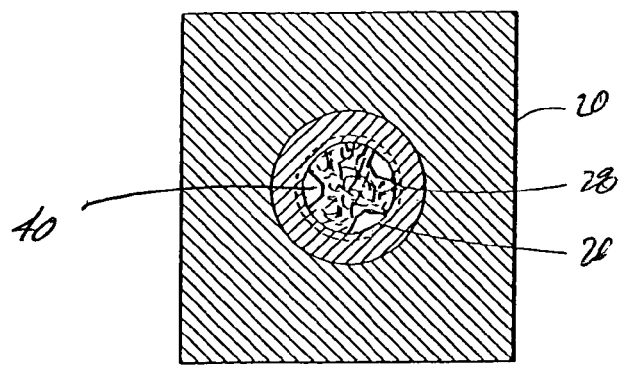
FIG. 3 is a cross-sectional view through the line 3—3 of FIG. 2.
Figure 4:
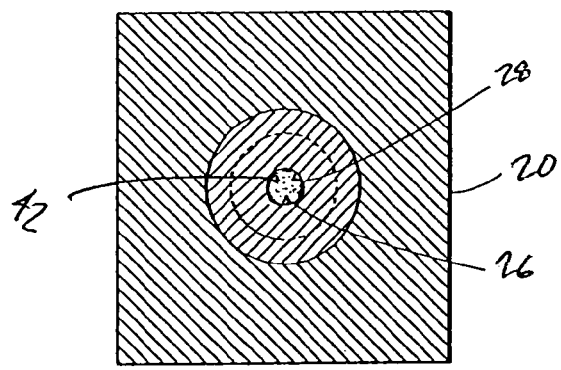
FIG. 4 is a cross-sectional view through the line 4—4 of FIG. 2.

The fins 38 of the present invention have a height, or protrusion into the bore 22, that is proportionally tapered relative to the taper of the barrel bore 22. More specifically, the fins 38 have a deeper profile 40 at the entry port 30 of the bore 22 and a shallower profile 42 at the exit port 32, generally maintaining the same clearance distance from the center line of the bore 22 along the length of the bore 22. FIGS. 3 and 4, cross-sectional views through lines 3—3 and 4—4 of FIG. 2, respectively, further illustrate the inward taper of the bore 22 of the molding machine 12 of the present invention while also illustrating the proportional taper of the fin 38 profile. FIG. 3 shows the larger inner diameter of the bore 22 proximal to the entry port 30 of the bore 22 where the fins 30 have a pronounced depth and profile 40, while FIG. 4 shows a reduced inner diameter of the bore 22 proximal to the exit port 32 of the bore 22 with the fins 38 having a reduced profile 42 that approaches nearly flat and flush with the inner surface of bore 22. It is possible to adjust the degree of taper and size of the entry port 30 and exit port 32 as well as the overall depth of the fins 38 to the application at hand and the composition of the material to be processed by the present invention.

The fins 38 serve two general purposes in the present invention. The first purpose of the fins 38 is to facilitate heat transfer into the extrusion material 36. The fins 38 provide increased surface area to provide an increased rate of thermal transfer from the bore 10 to the extrusion material 36. In the prior art, a torpedo was placed within the bore and supported on wings that extended from the bore surface. However, this configuration caused a high degree of turbulence within the barrel in addition to providing several locations where the linear flow of material collided with the wing supports resulting in a high degree of broken fiber reinforcing material. The fins 38 of the present invention allow heat to be transferred closer to the center of the bore 22 while also slightly increasing the overall turbulence within the bore 22 in addition to reducing the number of locations for potential flow collisions. In this manner, effective mixing and melting of the extrusion material 36 can be achieved while preserving the length of the reinforcing fibers 28 and maximizing fiber length in the finished product. The second purpose of the fins 38 is to generally direct the flow within the bore 22 into a substantially aligned linear direction. In this manner, the fins 38 generally cause the fibers 28 within the extrusion material 36 to align linearly along the axis of the flow. This effect is pronounced as the fins 38 operate in cooperation with the tapered bore 22 as will be fully described in the method below.

Referring back to FIGS. 1 and 2, the method of using the molding machine 12 of the present invention is shown. In FIG. 1, a dry blend mixture of base material 26, such as polymer, and reinforcing material 28, such as carbon fiber, is introduced into the plunger housing 14 via a feed port 24 with the assistance of a non-destructive auger 44 that gently feeds the material 36 in a downward direction. The nature of this sample composition 36 is of a dry and feathery consistency. Due to the low bulk density of this sample composition 36, an auger 44 is needed; however, a heavier composition may be gravity feedable and may not need an auger 44. A hopper (not shown) may also be provided to further assist in the feeding of the material 36. The plunger housing 14 and barrel housing 20 is heated or pre-heated prior to the start of mixture feeding process with heater bands (not shown), or the like. As shown in FIG. 1, the mixture 36 is fed into the plunger housing 14 and begins to melt and flow toward the entry port 30 of the bore 22 of the barrel housing 20. Due to heat applied to the plunger housing 14 and barrel housing 20, the mixture 36, particularly the polymer component 26 of the mixture 36, begins to melt.

Turning now to FIG. 2, filling and pre-packing the bore 22, in preparation for extrusion, is shown. Preferably, a volume of melted or partially melted composite material 36, with reinforcing members 28 loaded therein is packed into the bore 22 by blocking the exit port 32 of the bore 22. The plunger 16 is actuated forward to urge melted or partially melted composite material 36 from the plunger housing 14 into the barrel housing 22. Retraction of the plunger 16 permits the further loading of dry material 36 via the feed port 24. Actuation forward and back of the plunger 16 is preferably carried out to remove all air pockets in the bore 22 and to ensure smooth flow of material. It is preferred that the stroke length of the plunger 16 be from just rear of the feed port 30 to a location just prior to the entry port 24.

In accordance with the present invention, as melted or partially melted material 36 travels down the bore 22 toward the exit port 32, the polymer 26 is gradually heated to become fully melted. To enhance the heating of the polymer material 26 heat transfer into the partially melted material 25 is further enhanced by conducting heat from the housing walls 20 of the bore 22 into the fins 38 where there is increased surface area available for thermal transfer. The smooth taper of the bore 22 and the fins 38 cooperate together to cause the loaded reinforcing media 28, such as carbon fibers to become naturally aligned with the axis of the downward flow of melt material 36 along the length of the bore 22. In FIG. 3, at a location proximal to the entry port of the bore 22, the fibers 28 in the composition are randomly oriented within the base matrix of polymer 26. However, in accordance with the present invention, the fibers 28 become highly oriented as they travel further down the bore 22 and are particularly aligned proximal to the exit port 32 of the bore 22. As a result, the smooth taper of the bore 22 and the fins 38 located therein effectively orient the fiber 28 within the composition 36 while providing an increased surface area for thermal transfer thereby decreasing the required residence time of the composition 36 within the bore 22. In addition, the overall length of the bore 22 enables the mixture to be properly mixed without using turbulent mixers of the prior art, which would damage the delicate carbon fibers 28. The gradual inward taper of the bore 22 also provides a gentle increase in compression without creating additional turbulence or an increase in friction.

Once the bore 22 is pre-packed, flow of the composition 36, with the highly oriented fiber 28 therein, can be started. The exit port 32 is opened and the appropriate molding assembly is connected to the machine 12 for the injection of the composite material 36 therein. At the exit port 32, the composition 36 will be free of clumps of polymer 26 as the fins 38 enhance the overall consistency of the polymer 26 melt. Further, the polymer 26 and will be fully loaded with fibers 28 that are completely wetted out, aligned and evenly distributed therein. The process can then continue by feeding additional dry mixture 36 (prior to melting) through the feed port 24 and, with the assistance of the auger 44, routed into the plunger housing 14 and into the bore 22 for extrusion via the exit port 32. The plunger 16 actuates back and forth to maintain a constant flow of melting mixture 36 through the bore 22 to provide the molten extrudate out of the exit port 32.

Below is an example of an article formed by the molding machine 12 and corresponding method of the present invention. In this example, the molded article is a plastic heat sink where carbon fibers therein provide the article with high thermal conductivity, particularly in the direction of the length-wise orientation of the carbon fibers. The following table also provides a comparison with a prior art process employing a known screw machine to illustrate the advantages of the present invention. The chart below illustrates that use of the present invention results in longer fiber lengths in the molded part, which in turn results in higher overall thermal conductivity of the finished part.

COMPARISON

|  | Present Invention | Prior Art |
| --- | --- | --- |
| Base Matrix | Polymer Resin Polyetherimide (ULTEM) Liquid Crystal Polymer (XYDAR) Others | Polymer Resin Polyetherimide (ULTEM) Liquid Crystal Polymer (XYDAR) others |
| Reinforced Media | Carbon Fiber BP Amoco ermaGraph ™ CKDX pitch-based ultrahigh modulus graphite fiber iber Length: 0.25–2.0 inches Fiber Diameter: 10 microns | Carbon Fiber BP Amoco ThermaGraph ™ CKDX pitch-based ultrahigh modulus graphite fiber Fiber Length: 0.25–2.0 inches Fiber Diameter: 10 microns |
| Loading of Reinforced Media | 10–80 weight % | 10–80 weight % |
| Machine Used | Smooth Tapered Bore Bore Length: 12 inches Entry Port Size: 2 inches | Reciprocating Screw Injection Molding Machine |

-continued

|  | Present Invention | Prior Art |
| --- | --- | --- |
| Barrel Melt Temperature | Exit Port Size: 0.25 inches Polymer Dependent: 450–700° F. (for liquid crystalline polyester) | Polymer Dependent: 450–700° F. (for liquid crystalline polyester) |
| Fiber Length in Molded Part | 0.040–0.200 inches or greater | 0.015–0.040 inches |
| Thermal Conductivity | 120 Watts/m-°K | 28 Watts/m-°K |

Figure 5:
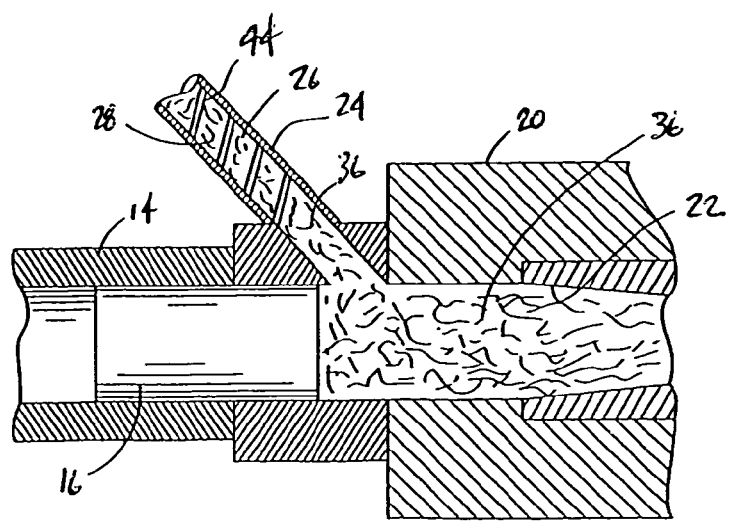
FIG. 5 is an alternative embodiment of the present invention with angled feed port.
Figure 6:
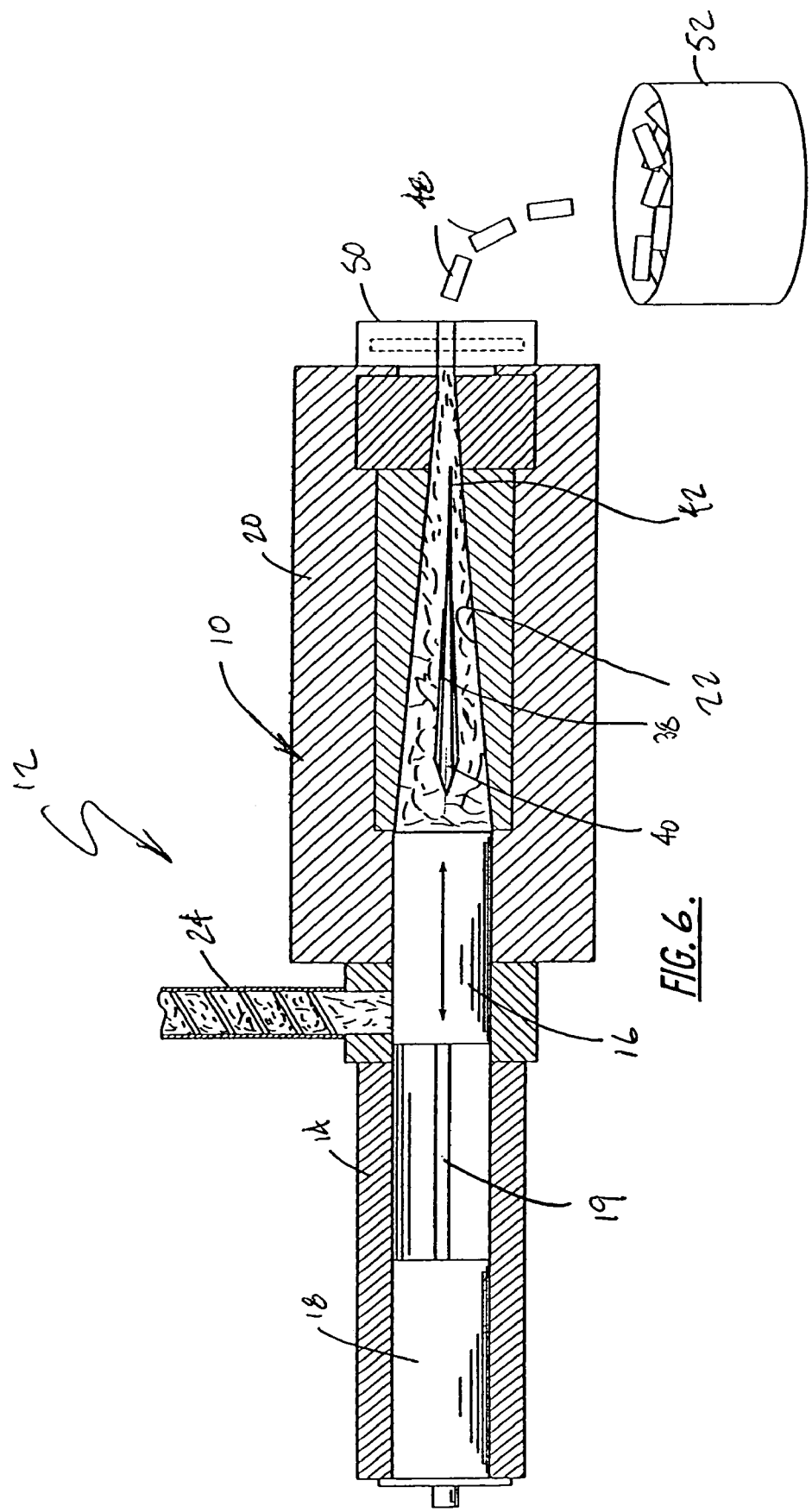
FIG. 6 is a cross-sectional view of the molding machine of the present invention being used as a pelletizer.

Referring now to FIGS. 5 and 6, two alternative embodiments of the present invention are shown. In FIG. 5, an alternative configuration of the feed port 24 is shown to be angled relative to the longitudinal axis of the bore 22 of the barrel housing 20. In the preferred embodiment above, the dry mixture 36 of polymer 26 and carbon fiber 28 is routed through the feed port 24 and into the plunger housing 14 necessitating that the material 36 make a 90 degree turn in direction. The alternative embodiment of FIG. 5 lessens the severity of the angle of entry of the polymer 26 with delicate reinforcing fibers 28 therein by "pre-aligning" the fibers 28. As a result, the initial flow of the mixture 36 is less turbulent with less trauma to the fibers 28, causing less breakage of fibers 28 in the mixture 36. In addition, the auger 44 feed thread size can be made larger to further reduce breakage of the fibers 28.

It has been described above that the molding machine 12 extrudes a melted composition 36 for injection into a cavity of a mold for forming a reinforced part or article. Appropriate nozzles (not shown) are attached to achieve this transition. As shown in FIG. 6, the molding machine 12 and method can be employed as a pelletizer to form composite pellets 48 for later use in a molding machine. In FIG. 6, a mechanical cutter 50, such as a radial cutter 50, is employed to cut extruded material 36 into pellets 48 for ejection into a collection bin 52. The cutter 50 may be driven by rack and pinion linkage, gears and other mechanical assemblies and would be fully adjustable to control the length of the pellet 48 and synchronization with the plunger 16, if required. Each of the pellets 48 include fiber strands therein (not shown) running along the entire length of the pellet 48 thus maintaining the integrity of the fiber 28 within each pellet 48. This pelletizing process of the present invention is greatly superior to prior art pultrusion methods. The pellets 48 can then be stored for further processing by later melting them and forming them into a molded part using an injection molding machine such as the one described above in accordance with the present invention.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A plunger molding machine for forming a composite polymer from a mixture of base polymer material and reinforcing particles having an aspect ratio greater than 1:1, comprising:

a barrel assembly having a first end and a second end opposite said first end, said barrel assembly including, a barrel bore extending through said barrel assembly, said barrel bore having an inner surface, an input end at said first end, an output end at said second end and a longitudinal axis extending from said first end to said second end, and longitudinal fins, each of said fins having a height, a proximal end and a distal end, said fins disposed on said inner surface, said fins protruding into said barrel bore from said inner surface and being substantially aligned with said longitudinal axis, wherein each of said proximal ends is connected to the interior surface, each of said distal ends extending inwardly thereby defining a central unobstructed region in said bore;

a plunger housing having a plunger bore extending therethrough, defining an initial melt chamber and in communication with said first end of said barrel bore; and a plunger within with said plunger bore, said plunger being reciprocatable within said plunger bore and into said first end of said barrel bore.

2. The plunger molding machine of claim 1, further comprising:

a feed port in said plunger housing; and an auger connected to said feed port to assist in the feeding of said mixture through said feed port and into said initial melt chamber.

3. The plunger molding machine of claim 1, wherein said barrel bore is continuously inwardly tapered from said first end to said second end where said first end has an opening relatively larger than an opening at said second end.

4. The plunger molding machine of claim 3, wherein the height of said fins tapers from a first height at said first end of said bore to a second height smaller than said first height at said second end of said bore, said fins being tapered proportionally relative to said taper of said bore.

5. The plunger molding machine of claim 1, wherein said auger feed is positioned relative to said plunger housing at an angle less than 90 degrees.

* * * * *